United States Patent
Walston

(10) Patent No.: US 9,268,630 B1
(45) Date of Patent: Feb. 23, 2016

(54) AUTOMATIC RECOVERY FROM NON-FUNCTIONAL DOWNLOAD

(71) Applicant: Robert Allen Walston, Atlanta, GA (US)

(72) Inventor: Robert Allen Walston, Atlanta, GA (US)

(73) Assignee: ARRIS Enterprises, Inc., Suwanee, GA (US)

(*) Notice: Subject to any disclaimer, the term of this patent is extended or adjusted under 35 U.S.C. 154(b) by 220 days.

(21) Appl. No.: 13/871,068

(22) Filed: Apr. 26, 2013

Related U.S. Application Data

(60) Provisional application No. 61/638,594, filed on Apr. 26, 2012.

(51) Int. Cl.
*G06F 9/45* (2006.01)
*G06F 13/00* (2006.01)
*G06F 11/08* (2006.01)
*G06F 9/445* (2006.01)

(52) U.S. Cl.
CPC . *G06F 11/08* (2013.01); *G06F 8/65* (2013.01)

(58) Field of Classification Search
CPC ... G06F 11/08; G06F 8/61–8/67; G06F 8/665
See application file for complete search history.

(56) References Cited

U.S. PATENT DOCUMENTS

| | | | | |
|---|---|---|---|---|
| 4,528,663 | A * | 7/1985 | Citta | 370/229 |
| 8,201,191 | B2 * | 6/2012 | Ladd et al. | 719/328 |
| 8,365,018 | B2 * | 1/2013 | McIntosh et al. | 714/23 |
| 8,522,232 | B1 * | 8/2013 | Carter et al. | 717/173 |
| 2006/0080650 | A1 * | 4/2006 | Winters et al. | 717/168 |
| 2008/0025327 | A1 * | 1/2008 | Kumar | 370/401 |
| 2008/0263348 | A1 * | 10/2008 | Zaltsman et al. | 713/2 |
| 2009/0066837 | A1 * | 3/2009 | Choi et al. | 348/553 |
| 2010/0313236 | A1 * | 12/2010 | Straub | 725/146 |
| 2010/0325622 | A1 * | 12/2010 | Morton | 717/168 |
| 2012/0023535 | A1 * | 1/2012 | Brooks | 725/110 |

* cited by examiner

*Primary Examiner* — Don Wong
*Assistant Examiner* — Mohammad Kabir
(74) *Attorney, Agent, or Firm* — Troy A. Van Aacken

(57) ABSTRACT

Systems, methods and computer readable media can operate to protect against non-functional software updates. Some implementations can provide for storing both a new load and a previous load in non-volatile memory of a customer premise equipment (CPE) device. After storing both loads, a software update can be applied to the CPE device, the software update comprising the new load to be used as a primary load replacing the previous load used by the CPE device. The device can then be rebooted using the new load as the primary load and a determination can be made whether the CPE device is operating correctly using the new load as the primary load. If the CPE device fails to operate correctly using the new load as the primary load, the CPE device can revert to the previous load as the primary load.

20 Claims, 4 Drawing Sheets

AUTOMATIC RECOVERY FROM NON-FUNCTIONAL DOWNLOAD

CROSS REFERENCE TO RELATED APPLICATIONS

This application claims priority to the filing date and benefit of U.S. Provisional Application Ser. No. 61/638,594, entitled "Automatic Recover from Non-Functional Download," filed Apr. 26, 2012, the entire disclosure of which is incorporated herein by reference as if set forth herein in its entirety.

TECHNICAL FIELD

This disclosure relates to software recovery for customer premise equipment.

BACKGROUND

The Data-Over-Cable Service Interface Specification (DOCSIS) was established by cable television network operators to facilitate transporting data traffic, primarily Internet traffic, over existing community antenna television (CATV) networks. In addition to transporting data traffic, as well as television content signals over a CATV network, multiple services operators (MSO) also use their CATV network infrastructure for carrying voice, video on demand (VoD) and video conferencing traffic signals, among other types. Similarly, telecommunications companies (telcos) have expanded their offerings into high speed data and video offerings.

These services typically involve specialized customer premise equipment (CPE) devices (e.g., cable modems (CMs), set top boxes (STBs), multimedia terminal adapters (MTAs), digital subscriber line (DSL) modems, integrated services digital networks (ISDN) modems, etc.). Similarly to many hardware devices, these CPE devices occasionally receive software updates. These software updates can resolve issues or problems discovered after the sale or release of the CPE device or the last software update. However, sometimes these updates can themselves be a source of problems. Such problems may be impossible or difficult to detect prior to release and can be expensive to resolve on a large scale.

BRIEF DESCRIPTION OF THE DRAWINGS

Like reference numbers and designations in the various drawings indicate like elements.

DETAILED DESCRIPTION

In some implementations of this disclosure, systems and methods can operate to automatically recovery from a non-functional software load (e.g., installed during an upgrade cycle).

With a large number of geographically diverse CPE devices located in subscribers' homes, it can be problematic to upgrade a large number of units to a load that contains an error (e.g., a software bug) that prevents the unit from being able to successfully register with the headend. In situations where a software error renders the CPE device inoperable, correcting the problem can involve many expensive truck rolls to retrieve/replace the non-communicative units, and can also cause a prolonged service outage to subscribers that have the inoperable devices.

Figure 1:
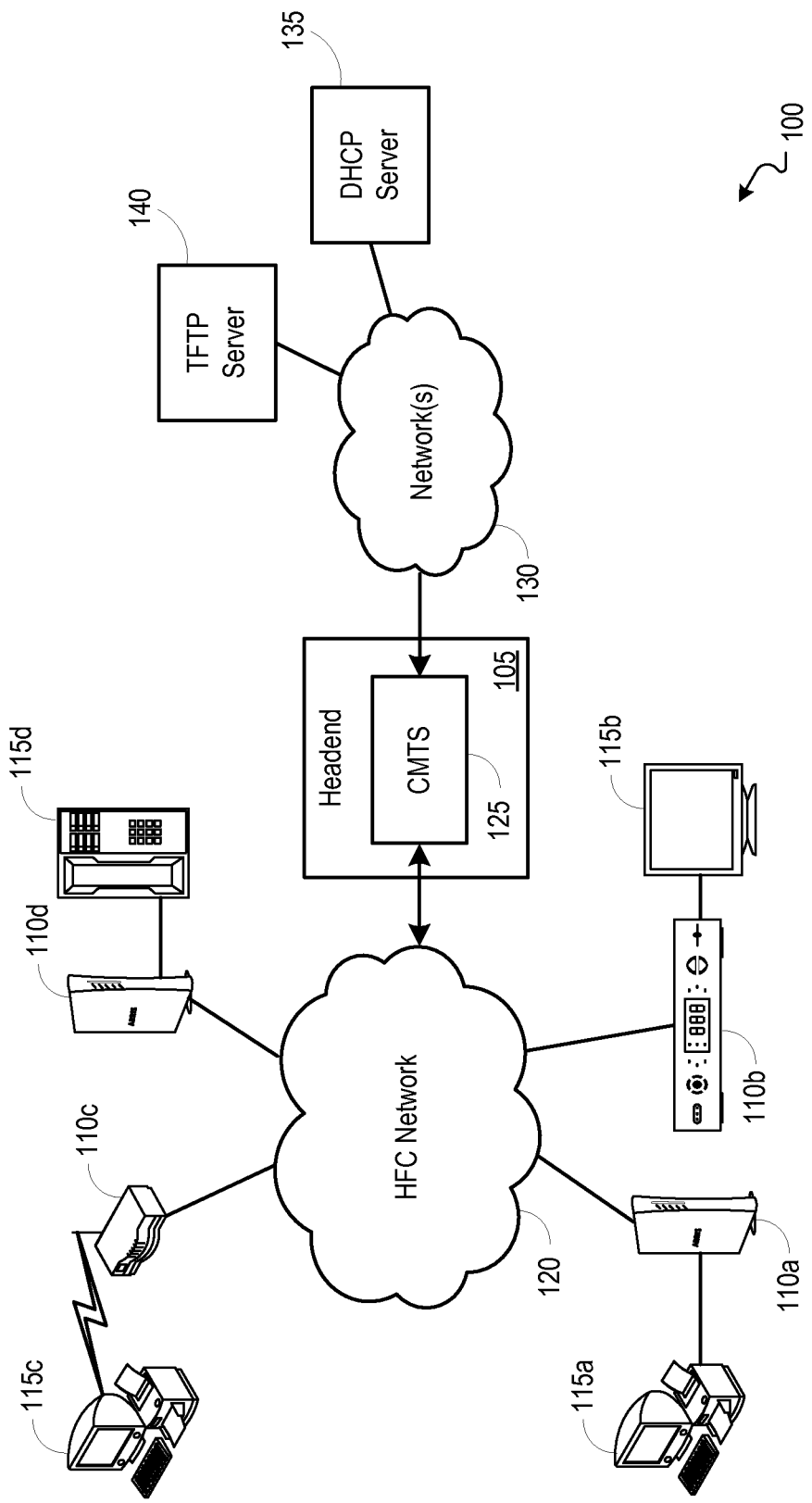
FIG. 1 is a block diagram illustrating an example environment operable to provide automatic recovery from a non-functional download.

FIG. 1 is a block diagram illustrating an exemplary network environment operable to provide automatic recovery from a non-functional download. In some implementations, a headend 105 can provide video, data and/or voice service(s) to customer premise equipment (CPE) devices 110a-d in one or more subscriber groups (e.g., service group(s)). The CPE devices can include, for example, a cable modem 110a, a set top box 110b, a wireless router including an embedded cable modem 110c, or a media terminal adapter (MTA) 110d, among many others (e.g., digital subscriber line (DSL) modem, voice over internet protocol (VoIP) terminal adapter, an embedded multimedia terminal adapter (eMTA), video game console, digital versatile disc (DVD) player, communications device, etc.). A cable modem 110a can facilitate communications from the headend 105 to a computer 115a. A set top box 110b can facilitate communications from the headend 105 to a television or a digital video recorder. A wireless router 110c can facilitate wireless communications with a computer 115c to a headend 105. An MTA 110d can facilitate communications between a telephone 115d to a headend 105. In some implementations, the MTA and cable modem functionality can be embedded within an eMTA, the eMTA being operable to facilitate both voice and data communications to the headend.

The CPE devices 110a-d can communicate with the headend 105 via a network, such as, for example, a hybrid fiber-coax (HFC) network 120. The headend 105 can include devices such as a cable modem termination system (CMTS) 125 and/or an edge quadrature amplitude modulation (EQAM) device (not shown), or a combined or converged device (not shown) including multiple edge and/or video or data processing functionalities. Such devices can operate to facilitate communications between a network 130 and the CPE devices 110a-d. In various implementations, the network 130 can include one or more networks internal to the headend and/or one or more networks external to the headend (e.g., one or more extranets, the Internet, etc.).

Data services can be handled by the headend 105 through a CMTS 125. The CMTS 125 can receive data signals from external device(s) or nodes through network(s) 130. The network(s) 130, for example, can operate using internet protocol (IP), sending data packets to and receiving data packets from the headend 105. In some examples, the CMTS 125 can be paired with a SIP proxy server (not shown) operable to provide voice over internet protocol (VoIP) services with voice connectivity to other subscribers or voice connectivity to a public switched telephone network (PSTN) (not shown). In still further examples, one or more video sources may provide streaming data through the network(s) 130 to the CMTS 125.

In some implementations, the CMTS 125 can forward packets destined for subscribers to an EQAM device used to modulate the signal onto a carrier waveform. The carrier waveform can include both data and video streams, in both multicast and unicast (e.g., point-to-point) formats for transmission to a combiner, which can combine multiple signals onto a single fiber for transmission to one or more CPE devices 110a-d via the hybrid fiber-coax (HFC) network 120.

In other implementations, the CMTS 125 can modulate a baseband signal to a carrier wave and transmit the signal to a combiner for upconversion to a transmission frequency.

When a CPE device 110*a-d* initially attempts to connect to the headend 105, the device 110*a-d* goes through a ranging and registration process with the headend 105. Ranging typically involves finding and locking onto a signal and determining a timing offset for the device 110*a-d*. The registration process typically includes retrieval of a configuration filename from a dynamic host control protocol (DHCP) server 130 through the network 125. Upon receipt of the configuration filename, the CPE device 110*a-d* identifies a trivial file transfer protocol (TFTP) server 135 where the configuration file is stored. The CPE device 110*a-d* then requests the configuration file from the TFTP server 135 using the filename provided by the DHCP server. Upon receiving the configuration file, the CPE device 110*a-d* registers with the CMTS 120.

In some instances, after a CPE device 110*a-d* has been deployed (e.g., distributed to a customer), the manufacturer of the device 110*a-d* or an MSO associated with the device 110*a-d* would like to modify the software (e.g., load) on the device. For example, the manufacturer might have located a bug in the software and desire to correct the bug through a software update. Software updates can be distributed to the devices through the provisioning/registration process. In particular, the configuration file can include a reference to a software load, and the device can determine whether the identified software load is present on the device, or whether a new software load should be retrieved and applied to the device. Prior art mechanisms for applying such updates typically include updating the entire load for the device 110*a-d*. Such updates, however, can occasionally render the entire device unusable based upon, e.g., the particular circumstances associated with a particular deployment configuration or a faulty software update.

Figure 2:
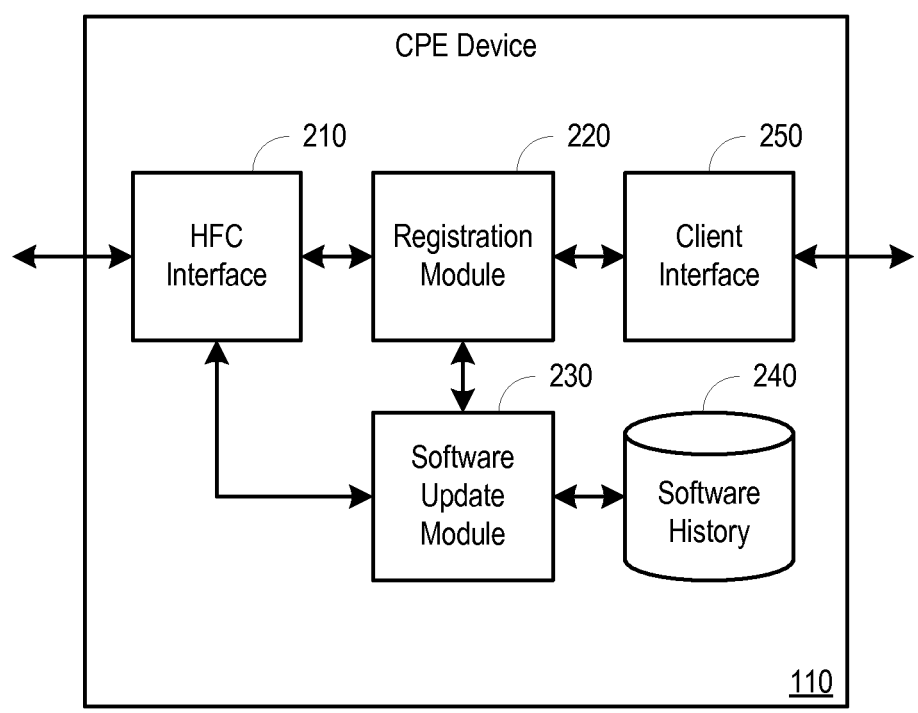
FIG. 2 is a block diagram illustrating an example customer premise device operable to provide automatic recovery from a non-functional download.

FIG. 2 is a block diagram illustrating an example customer premise equipment (CPE) device operable to provide automatic recovery from a non-functional download. The CPE device 110 can include an HFC interface 210, a registration module 220, a software update module 230, a software history data store 240 and a client interface 250. The HFC interface 210 can be used to provide an interface to the HFC network. It should be understood that in other devices, the HFC interface 210 can be a more generic network interface. The registration module 220 is operable to register with a service provider. However, in some implementations (e.g., when providing updates for standard consumer electronic devices), it should be understood that the registration module is optional and can be eliminated. The software update module 230 can be operable to determine whether a newer software load is available and update the software load when a newer version is available. The client interface is operable to provide a client interface, for example, to a host computer in the case of a cable modem or MTA device, or to a television for a DVD player or video game console.

In some implementations, the software update module 230 can keep track of whether it has successfully registered since its last software/firmware upgrade using the software history data store 240. Alternatively, the software module can keep track of some other metric that identifies whether the system is operating correctly. The CPE device can track whether it has successfully registered since its last software/firmware upgrade, for example, by setting a flag in the software history data store. The software history data store 240 can include, e.g., non-volatile memory within the device.

In those examples using registration as the operational download metric, the CPE device can attempt to register using the registration module 220 with the network through the HFC interface 210 upon the software update module 230 installing the new load. After the CPE device 110 completes a certain number of attempts at registering (e.g., scanning the RF spectrum and/or attempting to range/register on whatever signals it finds), the device can use the software update module 230 and software history data store 240 automatically revert to its previous (e.g., known working) load to attempt to recover. The software history data store 240 can save the last known working version of the software load for the purpose of providing a reversion option for the software update module 230.

In some implementations, if after reverting to the previous load the device 110 continues to fail to recover, the software update module 230 can assume a network problem and reinstall the newer load from the software history data store 240.

In some implementations, if the CPE device 110 recovers with its previous load then the device 110 continues running, and the software update module 240 generates an event to notify the operator through the HFC interface 210 that it is running the older load.

When the software update module 230 completes an upgrade it sets an NVM update value in the software history data store 240 to indicate it has just upgraded but not yet registered. After the device 110 reboots, if the registration module 220 registers successfully, then the software update module 230 resets the NVM update value and the device 110 continues to operate normally. If the registration module 220 fails to register after a pre-defined number of scans of the RF spectrum, however, it will identify the value associated with the NVM update flag. If the NVM value is set (upgrade completed) then the software update module 230 will revert to a previous known operational load (e.g., retrieved from the software history data store 240) and set an NVM reversion flag (e.g., indicating a recovery attempt). If the registration module 220 successfully registers with the previous known operational load and the software update module identifies that the NVM reversion flag is set, the software update module 230 identifies that it used its previous known operational load to recover. When the previous known operational load is used to successfully recover from the bad update, the software update module 230 generates a syslog or other event.

However, in some implementations, if the registration module 220 fails to register after a pre-defined number of scans with the previous known operational load, the software update module 230 decides that the problem is a network issue and returns back to the newer load. Thus, the software update module 230 would reset the update and reversion flag so that the device 110 continues with the new load. Alternatively, the device 110 could send a syslog if it is running the previous known operational load and has advanced to the config file processing stage. This can be beneficial when the config file triggers a re-download of the N load. It can also be help to disable any separately loadable eSAFE modules (e.g. eRouter) in order to ensure no load incompatibility.

Figure 3:
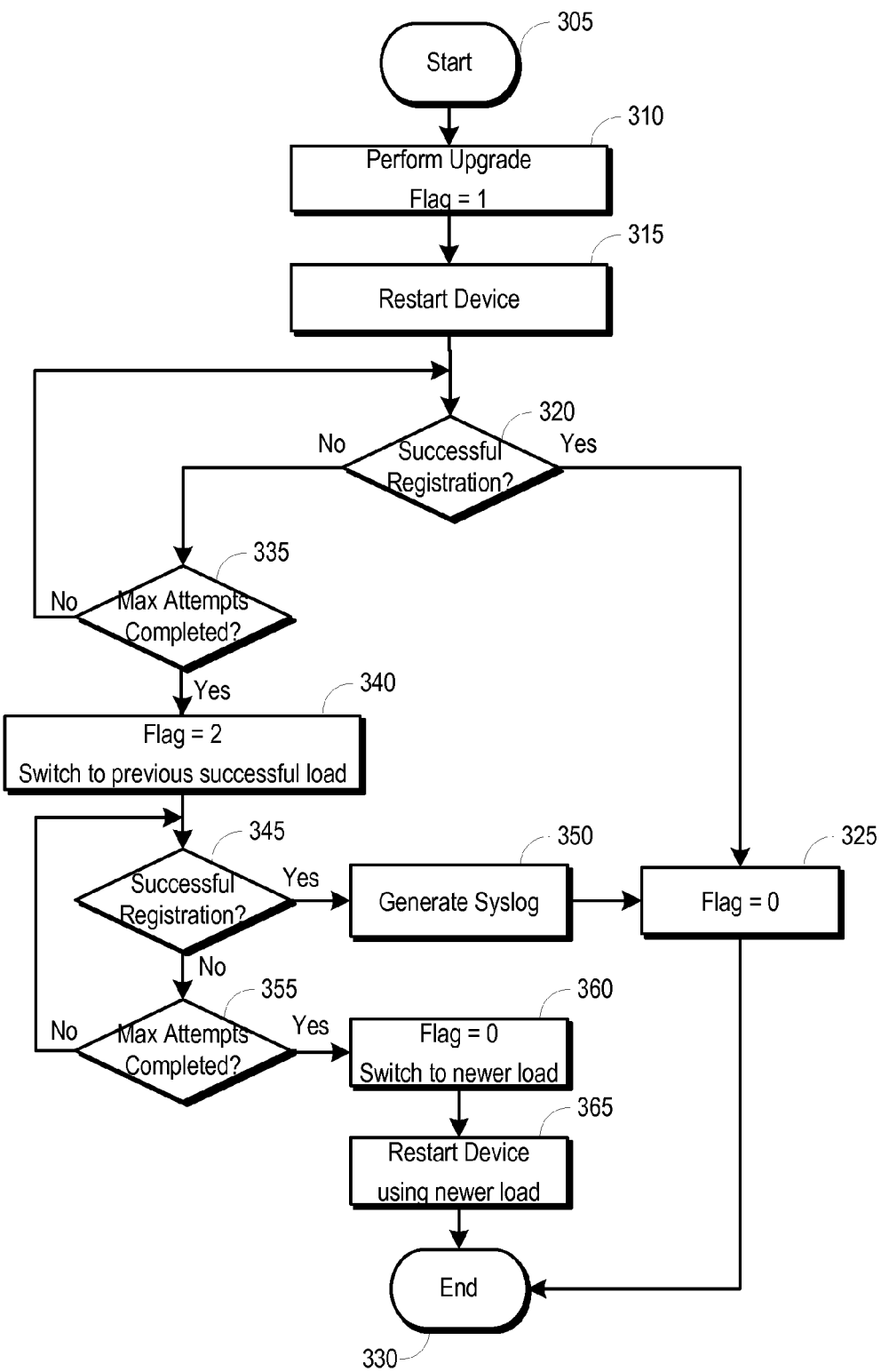
FIG. 3 is a flowchart illustrating an example process operable to provide automatic recovery from a non-functional download.

FIG. 3 is a flowchart illustrating an example process 300 operable to provide automatic recovery from a non-functional download. The process 300 starts at stage 305. At stage 310, an upgrade/update is applied. The upgrade/update can be applied, for example, by a software update module (e.g., software update module 230 of FIG. 2).

At stage 315, the device is restarted. A device restart can be initiated, for example, by a software update module (e.g., software update module 230 of FIG. 2). At stage 320, a determination is made whether a successful registration has been performed. The determination of whether registration is successful can be made, for example, by a registration module (e.g., registration module 220 of FIG. 2). In some implementations, successful registration can be replaced or supplemented with other metrics indicating whether the software update is successful (e.g., whether the operating system is stable, a communication rate, etc.).

If the registration is successful, the process 300 moves to stage 325 where a flag is set. The flag can be set, for example, by a software update module (e.g., software update module 230 of FIG. 2). In some implementations, the flag can be set to 1. However, it should be understood that there are many different values that could be used to represent a particular state associated with the software update, and all such values are intended to be encompassed within the scope of this disclosure. After setting the flag, the process 300 ends at stage 330.

Returning to stage 320, if the registration is not successful, the process 300 moves to stage 335 where it is determined whether a maximum number of attempts has been completed. The determination of whether the maximum attempts to register have been completed can be made, for example, by a software update module (e.g., software update module 230 of FIG. 2) in conjunction with a registration module (e.g., registration module 220 of FIG. 2). In those implementations that do not use registration as a success metric, or supplement registration with one or more additional metrics, stage 335 can identify whether a threshold failure level has been met. If the maximum number of attempts have not been made, the process 300 returns to stage 320 to attempt registration again.

If the maximum number of registration attempts have been made, the process 300 proceeds to stage 340, where a flag is set to a reversion state and the device reverts to a previous successful load. The flag can be set to a reversion state and the software version reverted, e.g., by a software update module (e.g., software update module 230 of FIG. 2) in conjunction with a software history data store (e.g., software history data store 240 of FIG. 2).

At stage 345, registration is attempted and a determination is made whether registration is successful. The registration and determination of success can be performed, for example, by a registration module (e.g., registration module 220 of FIG. 2). In those implementations using another metric in addition to (or instead of) registration, stage 345 can determine whether the previous successful load is working correctly.

If registration is successful, the process 300 proceeds to stage 350 where a syslog is generated. The syslog can be generated, for example, by a software update module (e.g., software update module 230 of FIG. 2) in conjunction with a software history data store (e.g., software history data store 240 of FIG. 2). The process 300 then proceeds to stage 325, where the flag is reset to an operational state at stage 325, and the process 300 ends at stage 330.

Returning to stage 345, if registration is not successful, the process 300 proceeds to stage 355 where a determination is made whether a max number of attempts have been completed. The determination can be made, for example, by a software update module (e.g., software update module 230 of FIG. 2). Again, it should be understood that in some implementations, a max number of attempts can be replaced with some other success or failure metric. If the maximum number of registration attempts have not been made, the process returns to stage 345 and attempts to register successfully again.

However, if the maximum number of attempts has been reached, the flag is reset to an operational state and the newer load is used. The flag can be reset, for example, by a software update module (e.g., software update module 230 of FIG. 2) in conjunction with a software history data store (e.g., software history data store 240 of FIG. 2). The device is then restarted with the newer load at stage 365, and the process 300 ends at stage 330.

Other implementations of this disclosure can be used to ensure that upgraded settings to router software do not cause irrevocable failures. Many devices, such as cable modems, are now expected to have internal embedded router software. The router software controls all aspects of the device's open systems interconnection (OSI) level 3 communications. In the same way that a software load can disrupt level 2 communications at a cable modem, for example, router settings pushed from the headend could also disable or disrupt communications between devices behind the modem and the Internet or other wide area networks.

Thus, a router device could have two stored blocks of settings, one used and one unused. Each time a new setting or group of settings is received, the unused block could be updated with the changes. Then the software would switch its activity from the previously used block of settings to the new block of settings, possibly in response to a direct user command, or possibly automatically. If the software detected that after switching to the new settings that communications with the Internet or WAN were disrupted, the software could switch back to the original block of settings and log that reversion. The software could alternatively notify the user of the failure and ask the user for permission to switch back.

Figure 4:
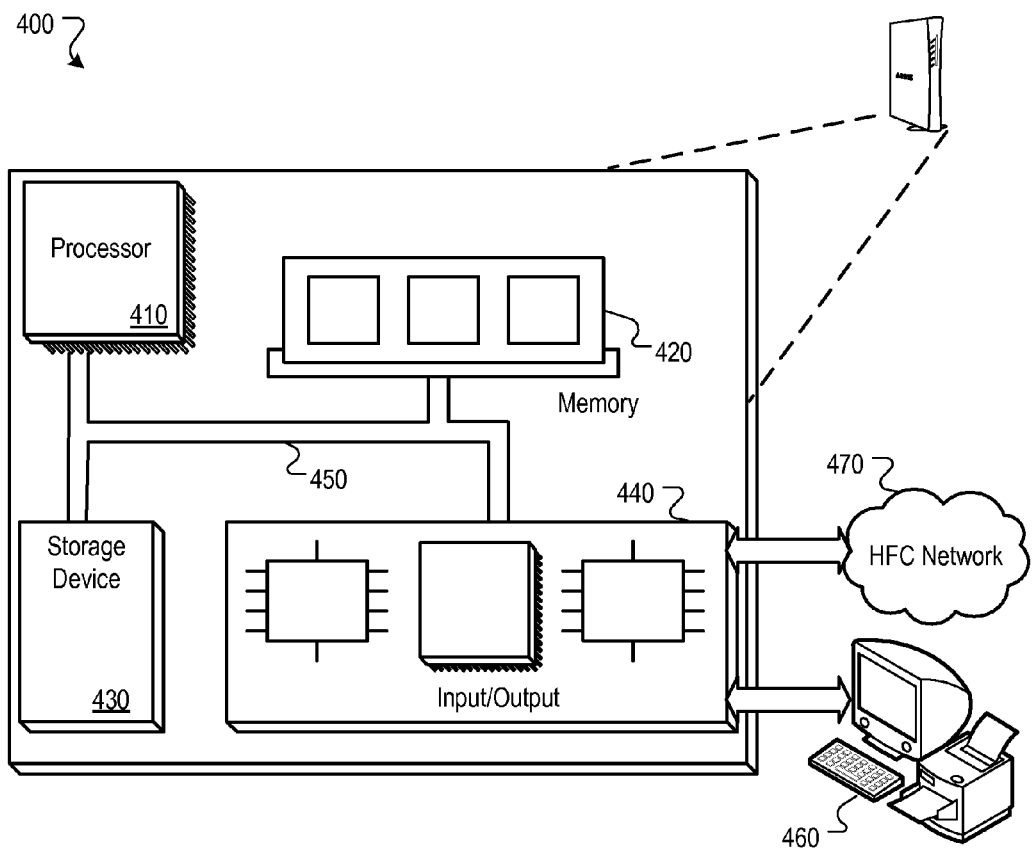
FIG. 4 is a generic block diagram of a hardware configuration for a customer premise system operable to provide automatic recovery from a non-functional download.

FIG. 4 is a generic block diagram of a hardware configuration for an embedded media terminal adapter (eMTA) operable to provide automatic recovery from a non-functional download. While an eMTA is shown, it should be understood that many different kinds of CPE devices (e.g., including cable modems, DSL modems, wireless routers, consumer electronic devices, etc.) can include systems and processes to provide automatic recovery from a non-functional download. The eMTA 400 can include a processor 610, a memory 620, a storage device 630, and an input/output device 640. Each of the components 610, 620, 630, and 640 can, for example, be interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the device 600. In one implementation, the memory 620 is a computer-readable medium. In one implementation, the memory 620 is a volatile memory unit. In another implementation, the memory 620 is a non-volatile memory unit.

In some implementations, the storage device 630 is capable of providing mass storage for the device 600. In one implementation, the storage device 630 is a computer-readable medium. In various different implementations, the storage device 630 can, for example, include a hard disk device, an optical disk device, flash memory or some other large capacity storage device.

The input/output device 640 provides input/output operations for the device 600. In one implementation, the input/output device 640 can include one or more of a plain old telephone interface (e.g., an RJ11 connector), a network interface device, e.g., an Ethernet card, a serial communication device, e.g., an RS-232 port, and/or a wireless interface device, e.g., and 802.11 card. In another implementation, the input/output device can include driver devices configured to receive input data and send output data to other input/output devices, such as one or more subscriber devices 660 (e.g., computer, television, etc.), as well as sending communications to, and receiving communications from a network 670. Other implementations, however, can also be used, such as mobile computing devices, mobile communication devices, set-top box television client devices, etc.

The CPE devices of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, the method comprising:
    applying a software update on a data over cable services interface specification (DOCSIS)-based customer premise equipment (CPE) device, the software update comprising a new software load to be used as a primary load that replaces a previous software load that was previously used as the primary load by the DOCSIS-based CPE device;
    saving the new software load and the previous software load in non-volatile memory;
    rebooting the DOCSIS-based CPE device using the new software load as the primary load;
    determining whether the DOCSIS-based CPE device has failed to register with a headend device using the new software load as the primary load;
    if the DOCSIS-based CPE device fails to register with the headend using the new software load as the primary load, applying the previous software load as the primary load; and
    rebooting the DOCSIS-based CPE device using the previous software load as the primary load.

2. The method of claim 1, further comprising:
    determining whether the DOCSIS-based CPE device has failed to register with the headend device using the previous software load as the primary load; and
    identifying the failure as a network problem.

3. The method of claim 2, further comprising responsive to identifying the network problem, reapplying the new software load as the primary load for the DOCSIS-based CPE device.

4. The method of claim 1, wherein determining whether the DOCSIS-based CPE device has failed to register with a headend device comprises determining whether a maximum number of registration attempts have been attempted without successfully registering the DOCSIS-based CPE device with the headend device.

5. The method of claim 1, further comprising after applying the software upgrade on the DOCSIS-based CPE device, setting an update flag in a non-volatile register on the DOCSIS-based CPE device to identify that a new software load has been applied for a first time.

6. The method of claim 5, further comprising after determining that the DOCSIS-based CPE device has failed to register with a headend device, determining a status of the flag in the non-volatile register; and
    if the status of the flag in the non-volatile register indicates a new software load, reverting to using the previous software load as the primary load.

7. The method of claim 6, further comprising responsive to the DOCSIS-based CPE device reverting to using the previous software load as the primary load, setting the flag in the non-volatile register on the DOCSIS-based CPE device to identify that a new software load has been unsuccessful and that the previous software is being used as the primary load.

8. The method of claim 7, further comprising:
    responsive to failing to register using the previous software load, determining a status of the flag in the non-volatile register;
    if the status of the flag in the non-volatile register indicates that the previous software load was also unsuccessful, identifying the failure to register as a network problem and reverting to using the new software load as the primary load and resetting the flag in the non-volatile register before restarting the DOCSIS-based CPE device.

9. A data over cable services interface specification (DOCSIS)-based customer premise equipment (CPE) device, comprising:
    a network interface operable to provide upstream and downstream communications with a headend system;
    a software update module operable to retrieve and apply a software update on the DOCSIS-based CPE device, the software update comprising a new software load to be used as a primary load that replaces a previous software load that was previously used as the primary load by the DOCSIS-based CPE device;
    a data store operable to store the new software load and the previous software load;
    wherein the software update module is further operable to cause the DOCSIS-based CPE device to reboot using the new software load as the primary load, and to determine whether the new software load is non-functional and to revert to using the previous software load as the primary load if the new software load is non-functional.

10. The device of claim 9, wherein the software update module is operable to determine whether the reversion to using the previous software load has resulted in the device successfully registering with the headend system, and if the device has not successfully registered with the headend system, the software update module is operable to cause the device to revert to using the new software load.

11. The device of claim 9, wherein the software update module determines that the new software load is non-functional responsive to identifying a successive number of registration failures that exceeds a threshold.

12. The device of claim 9, wherein the software update module is operable to set a status of an update flag in a non-volatile register on the DOCSIS-based CPE device to identify that a new software load has been applied for a first time.

13. The device of claim 12, wherein the software update module determines the status of the update flag in the non-volatile register in response to failing to register with the headend system, and if the status of the update flag in the non-volatile register indicates a new software load, the software update module is operable to cause the device to revert to using the previous software load as the primary load.

14. The device of claim 13, wherein responsive to the DOCSIS-based CPE device reverting to using the previous software load as the primary load, the software update module is operable to set the update flag in the non-volatile register on the DOCSIS-based CPE device to identify that a new software load has been unsuccessful and that the previous software is being used as the primary load.

15. The device of claim 14, wherein the software update module determines status of the update flag in the non-volatile register in response to failing to register with the headend system, and if the status of the update flag in the non-volatile register indicates a new software load was unsuccessful and the previous software load is currently being used as the primary load, the software update module is operable to cause the device to revert to using the new software load as the primary load and to reset the update flag in the non-volatile memory.

16. One or more non-transitory computer readable media, the computer readable media being executable by one or more processors, and including instruction operable to cause the one or more processors to perform operations comprising:
    storing a new software load and a previous software load in non-volatile memory;
    applying a software update on a customer premise equipment (CPE) device, the software update comprising the new software load to be used as a primary load replacing the previous software load used by the CPE device;
    rebooting the CPE device using the new software load as the primary load;
    determining whether the CPE device is operating correctly using the new software load as the primary load;
    if the CPE device fails to operate correctly using the new software load as the primary load, applying the previous software load as the primary load; and
    rebooting the CPE device using the previous software load as the primary load.

17. The one or more computer-readable media of claim 16, further comprising instructions operable to cause the one or more processor to perform operations comprising:
    determining whether the CPE device has failed to register with a network using the previous software load as the primary load; and
    identifying the failure to register with the network as a network outage, and reapplying the new software load as the primary load for the CPE device.

18. The one or more computer readable media of claim 16, wherein determining whether the CPE device is operating correctly comprises identifying if the CPE device has failed to register with a network after a threshold number of registration attempts have been attempted without successfully registering the CPE device with the network.

19. The one or more computer readable media of claim 16, further comprising instructions operable to cause the one or more processor to perform operations comprising:
    after applying the software upgrade on the CPE device, setting an update flag in a non-volatile register on the DOCSIS-based CPE device to identify that the new software load has been applied.

20. The one or more computer readable media of claim 19, further comprising instructions operable to cause the one or more processor to perform operations comprising:
    after determining that the new software is not operating correctly, determining a status of the flag in the non-volatile register; and
    if the status of the flag in the non-volatile register indicates the new software load, reverting to using the previous software load as the primary load;
    setting the flag in the non-volatile register on the CPE device to identify that the new software load was not successful and that the previous software is being used as the primary load.

* * * * *